United States Patent

Thuerman et al.

Patent Number: 5,269,729
Date of Patent: Dec. 14, 1993

[54] WEAR RESISTANT CHAIN JOINT SEAL

[76] Inventors: John H. Thuerman, 110 D E. Sutton Pl., Waukesha, Wis. 53188; George C. Seaman, 3045 S. 50th St., Milwaukee, Wis. 53219; Robert M. Miller, 3153 W. Colony Dr., Greenfield, Wis. 53221

[21] Appl. No.: 944,171

[22] Filed: Sep. 11, 1992

Related U.S. Application Data

[63] Continuation-in-part of Ser. No. 887,538, May 22, 1993, abandoned.

[51] Int. Cl.⁵ ............................................. F16G 13/02
[52] U.S. Cl. ......................... 474/207; 474/219; 474/231
[58] Field of Search ............... 474/206, 207, 219, 226, 474/228, 230, 231

[56] References Cited

U.S. PATENT DOCUMENTS

| | | | |
|---|---|---|---|
| 2,336,913 | 12/1943 | Albrecht | 74/257 |
| 2,411,207 | 11/1946 | Hait | 74/257 |
| 2,411,214 | 11/1946 | Keech | 474/207 X |
| 2,906,562 | 9/1959 | Burgman | 305/10 |
| 3,135,126 | 6/1964 | Rudolph | 74/255 |
| 3,206,258 | 9/1965 | Heinrich | 474/207 X |
| 3,235,315 | 2/1966 | Schnacke | 474/207 X |
| 3,244,457 | 4/1966 | Ross | 305/11 |
| 3,336,089 | 8/1967 | Krickler | 305/11 |
| 3,341,259 | 9/1967 | Schulz et al. | 474/207 X |
| 3,365,246 | 1/1968 | Otis et al. | 474/207 X |
| 3,379,480 | 4/1968 | Storm | 474/207 X |
| 3,391,964 | 7/1968 | Miyake | 474/207 X |
| 3,437,385 | 4/1969 | Deli | 474/207 X |
| 3,447,837 | 6/1969 | Deli et al. | 305/11 |
| 3,451,727 | 6/1969 | Deli et al. | 474/230 X |
| 3,492,885 | 2/1970 | Nolte | 74/257 |
| 4,094,515 | 6/1978 | Araya et al. | 474/207 X |
| 4,464,151 | 8/1984 | Kahl | 474/231 |
| 4,494,945 | 1/1985 | Ogino | 474/231 |
| 4,612,869 | 9/1986 | Poppe | 114/293 |
| 4,729,754 | 3/1988 | Thuerman | 474/207 |
| 5,088,597 | 2/1992 | Counter et al. | 198/835 |

OTHER PUBLICATIONS

Rexnord Corporation, Ultr-O-Life The O-Ring Roller Chain From Rex, Oct. 91.

Primary Examiner—Ramon S. Britts
Assistant Examiner—Roger J. Schoeppel
Attorney, Agent, or Firm—Michael, Best & Friedrich

[57] ABSTRACT

The invention provides sealing members for a chain. A pair of sealing members is provided for each end of a bushing. The sealing members respectively surround the ends of the bushing and are housed between inner sidebar portions and the outer sidebar portions of the chain. Each of the sealing members includes a collar which is pressed onto one of the ends of the bushing and which is positioned in closely spaced relation to one of the inner sidebars. Each collar has a circumferential flange or outer and inner collar portions which extend toward and engage one of the outer sidebars. Each collar defines an annular groove surrounding the bushing. Each sealing member further includes a resilient sealing ring housed in each annular groove. Each resilient sealing ring surrounds the bushing and engages in a sealing relation with the outer sidebar engaged by the collar in which it is housed.

39 Claims, 3 Drawing Sheets

WEAR RESISTANT CHAIN JOINT SEAL

RELATED APPLICATIONS

This application is a continuation-in-part of application Ser. No. 887,538, filed May 22, 1992, now abandoned.

FIELD OF THE INVENTION

The invention relates generally to chains and, more particularly, to chain joint seals.

BACKGROUND OF THE INVENTION

In chains used in abrasive environments, it is desirable to protect the wear surfaces comprised of the outside surfaces of the chain pins and the inside of the chain bushings by keeping these bearing surfaces lubricated and by preventing abrasive material from entering the space between the bearing surfaces. See for example, U.S. Pat. No. 4,464,151, issued to Kahl on Aug. 7, 1984, which is incorporated herein by reference.

A problem with prior art chain joint seals is that they wear quickly in certain applications such as when they are exposed to heat and very abrasive materials. For example, prior art chain joint seals wear quickly when used in material handling elevators where they are exposed to fine abrasive materials such as cement, ash, powdery metal (e.g. hot, dry, fine, powdery magnesium), or other materials. If the chain joint seal becomes worn, fine abrasive material can then enter into the chain joint and fill the space between the chain pin and a chain bushing, resulting in pin wear or dry cavitation-erosion type wear. This wear can limit chain life in a conventional chain.

SUMMARY OF THE INVENTION

The invention includes a chain having improved sealing members for precluding contaminants or abrasives from entering the space between the chain bushing and chain pin. A sealing member is provided for each end of a bushing. The sealing members respectively surround the ends of the bushings and are housed between inner sidebars and the outer sidebars of the chain. Each of the sealing members includes a collar which is pressed onto one of the ends of the bushing and positioned in closely spaced relation to one of the inner sidebars. The collar has a circumferential flange or alternatively, outer and inner collar portions, which extend toward one of the outer sidebars. The collar defines an annular groove surrounding the end of the bushing. The sealing member further includes a resilient sealing ring housed in the annular groove. The resilient sealing ring surrounds the end of the bushing and engages in sealing relation the opposed outer sidebar.

Other features and advantages of the invention will become apparent to those of ordinary skill in the art upon review of the following detailed description, claims, and drawings.

DETAILED DESCRIPTION OF THE PREFERRED EMBODIMENT OF THE INVENTION

Figure 1:
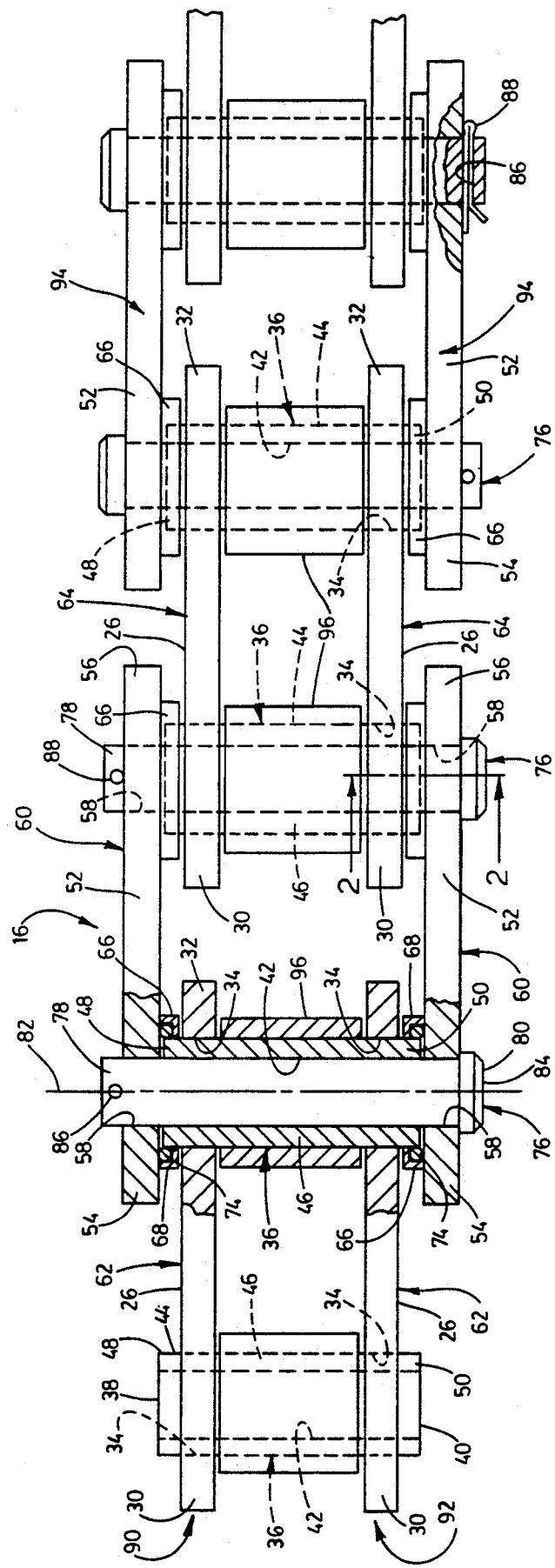
FIG. 1 is a top view, partially in section, of a chain embodying the invention.

Illustrated in FIG. 1 is a straight sidebar chain 16 embodying the invention and including a plurality of pairs of opposed, aligned, inner sidebars 26. Each inner sidebar 26 is an integral piece or member having opposite end portions 30 and 32. Each inner sidebar end portion 30 and 32 defines an aperture 34.

The chain 16 further includes tubular bushings 36 pressed into the apertures 34 of each pair of inner sidebars 26 so as to be secured to each pair of inner sidebars. Each bushing 36 has opposite ends 38 and 40, respectively, an inside surface 42 having an inside diameter, an outside surface 44 having an outer diameter, a central portion 46, and integral bushing extensions 48 and 50, respectively, at each end of the central portion 46. In the illustrated embodiment, the central portion 46, and the bushing extensions 48 and 50 all have the same outside diameter; however, in an alternative embodiment of the invention (not shown), the extensions 48 and 50 of each bushing have respective outside diameters that are smaller than that of the central portion 46 of the bushing 36. Each bushing 36 is supported by one pair of inner sidebar portions 30 or 32 such that the central portion 46 of that bushing 36 extends between those inner sidebar portions 30 or 32 and into each of the apertures 34 of those inner sidebar portions 30 or 32 and such that the bushing extensions 48 and 50 respectively project outwardly beyond the inner sidebar portions 30 or 32.

The chain 16 further includes a plurality of pairs of opposed, aligned outer sidebars 52. Each outer sidebar 52 is an integral piece or member having opposite end portions 54 and 56. Each outer sidebar end portion 54 and 56 includes an opening 58 having a diameter smaller than the outside diameter of the bushing extensions 48 or 50.

Each outer sidebar portion 54 of one pair 60 of outer sidebars 52 is adjacent and spaced from one of the inner sidebar portions 32 of one pair 62 of inner sidebars 26. Further, the opening 58 of each outer sidebar portion 54 of the one pair 60 of outer sidebars 52 is aligned with the opening 34 of one of the inner sidebar portions 32 of the one pair 62 of inner sidebars 26.

Each outer sidebar portion 56 of the one pair 60 of outer sidebars 52 is adjacent and spaced from one of the inner sidebar portions 30 of a pair 64 of inner sidebars 26 different from the pair 62. The opening 58 of each outer sidebar portion 56 of the one pair 60 of outer sidebars 52 is axially aligned with the inner surface of the bushing extension 48 or 50 supported by one of the inner sidebar portions 30 of the pair 64 of inner sidebar portions 30.

The chain 16 further includes a plurality of pairs of sealing assemblies 66. The sealing assemblies 66 of one of the pairs of sealing members respectively surround the bushing extensions 48 and 50 of one bushing, and each of the sealing assemblies 66 is housed between one of the inner sidebar portions 30 or 32, and one of the outer sidebar portions 54 or 56. Each of the sealing assemblies 66 includes (see FIGS. 2 and 3) a disk shaped collar 68 of hardened metal (or other suitable material) pressed onto one of the bushing extensions 48 or 50 and positioned in closely spaced relation to one of the inner sidebars 26. Each disk shaped collar 68 has a washer shaped portion through which passes one of the bushing extensions 48 or 50. The washer shaped portion has a periphery, and each disk shaped collar further includes, extending from the periphery of the washer shaped portion, a circumferential flange 70 extending toward and engaging one of the outer sidebars 52. Each disk shaped collar 68 defines an annular groove 72 surrounding one of the bushing extensions 48 or 50.

Figure 3:
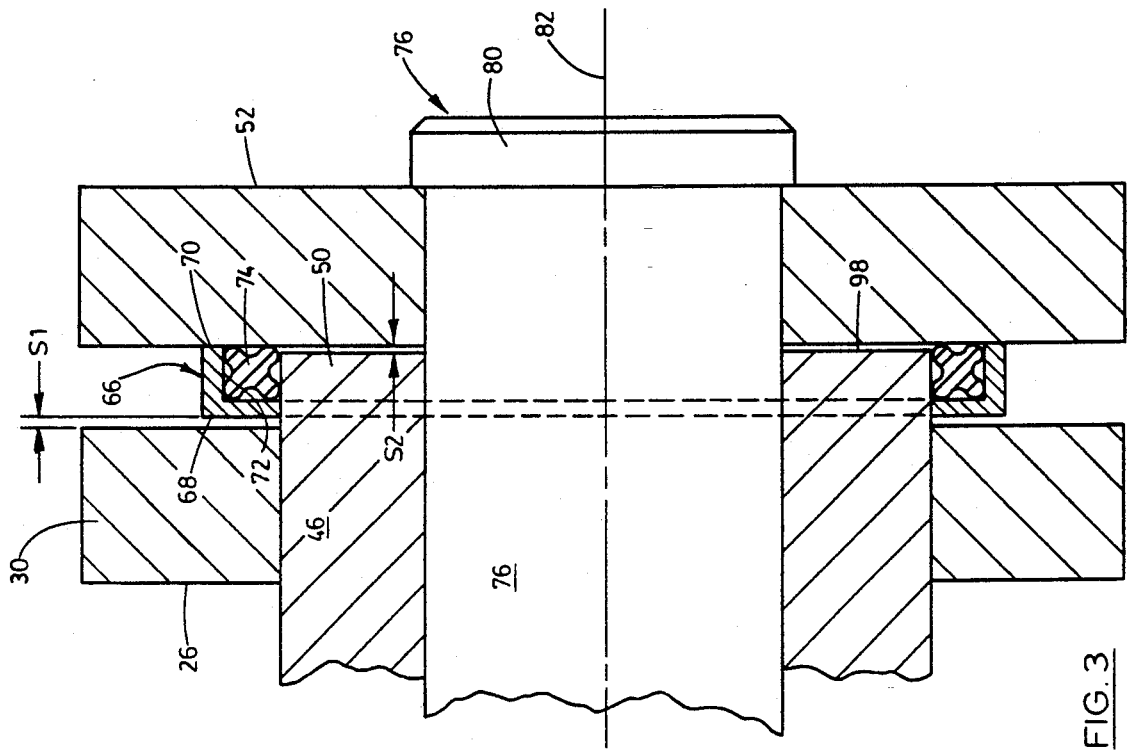
FIG. 3 is a view similar to FIG. 2 but showing an alternative embodiment of the invention.
Figure 2:
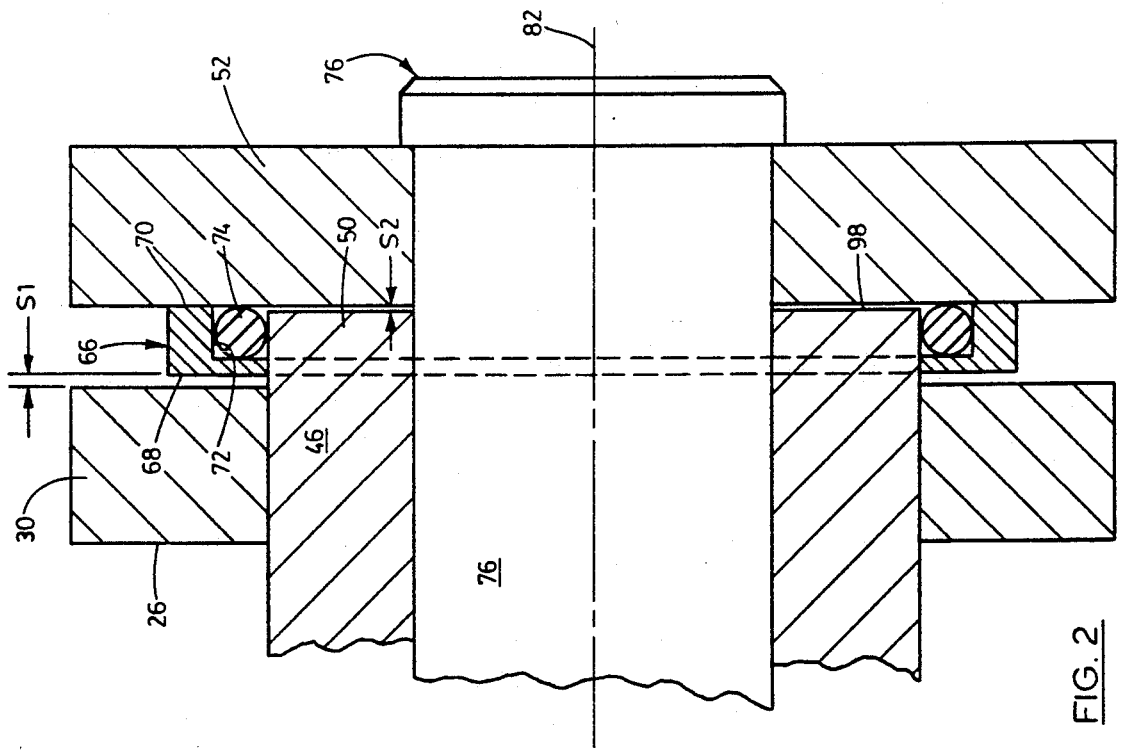
FIG. 2 is an enlarged sectional view taken along line 2—2 of FIG. 1, and illustrating a sealing member in accordance with one embodiment of the invention.

The sealing assemblies 66 further include resilient sealing rings 74 of polymeric material respectively housed in the annular grooves 72. Each resilient sealing ring 74 surrounds and engages one of the bushing extensions 48 or 50 and also engages in sealing relation the outer sidebar 52 engaged by the collar 68 in which it is housed. FIG. 2 shows one embodiment of the invention wherein each sealing ring 74 is circular in cross section. FIGS. 3 shows an alternative embodiment of the invention wherein each of the sealing rings 74 is generally X-shaped in cross section.

In a preferred embodiment of the invention, a space S1 is provided between each sealing assemblies 66 and the adjacent inner sidebar end portion 30 or 32 and that dimension (S1) is equal to or greater than the space S2 between the end 98 of the bushing 36 and the outside sidebar 52. This is to reduce any possibility of a sealing assemblies 66 being crushed by an inner sidebar portion 30 or 32 during any lateral movement of the inner sidebar portion 30 or 32 during use of the chain 16.

The chain 16 further includes a plurality of pins 76 respectively extending through the bushings 36 and respectively having opposite ends 78 and 80 housed in the openings in opposed outer sidebar portions 54 or 56 adjacent to the bushing extensions 48 or 50 of the respective bushings 36 to form chain joints connecting pairs of inner sidebars 26 with pairs of outer sidebars 52.

Each pin 76 has a longitudinal axis 82. In the specific arrangement illustrated, the end 80 of each pin has a head 84, and the end 78 of each pin has a cotter pin hole 86 transverse to the longitudinal axis 82 of the one pin. The chain 16 further includes a cotter pin 88 in each cotter pin hole 86. Alternatively, the chain 16 is of riveted construction, does not include cotter pin holes 86 or cotter pins 88, and instead includes a rivet formed head (not shown). For each chain joint, the outer sidebar portions 54 or 56, the inner sidebar portions 30 or 32, the bushing 36, and the sealing assemblies 66 are located axially between the head 84 and the cotter pin 88 (or rivet formed head).

The chain 16 has first and second sides 90 and 92, respectively. The heads 84 of pins 76 that are housed in one pair of opposed outer sidebars 60 are on the first side 90 of the chain, and the heads 84 of pins 76 that are housed in an adjacent pair 94 of outer sidebars 60 are on the second side 92 of the chain 16.

Optionally, the chain 16 further includes rollers 96 rotatably mounted over each bushing 36 and between opposed inner sidebars 26. In some embodiments of the invention, such as when the chain 16 is used in a centrifugal discharge elevator, the rollers 96 are preferably omitted.

The straight sidebar chain 16 is assembled by performing a method which includes in any order steps (a) and (b) defined as follows:

(a) Two of the bushings 36 are respectively inserted into opposed, aligned apertures 34 of a pair 62 of inner sidebars 26 such that the central portions 46 of the bushings 36 respectively extend between the inner sidebars 26 and through the opposed apertures 34 of the pair 62, and such that the bushing extensions 48 and 50 of the respective bushings project beyond the inner sidebars 26. Then, disk shaped collars 68 are respectively pressed onto the bushing extensions 48 and 50 at locations spaced from the respective inner sidebar portions. The collars 68 are pressed onto the bushing extensions 48 and 50 in an orientation such that the circumferential flange 70 of each collar on one bushing 36 faces away from the other collar 68 on the same bushing 36 and a portion of the flange 70 extends beyond the end of the bushing 36. The collars 68 are positioned such that they are spaced from the inner sidebar by a dimension greater than the extent of the flange portion beyond the end of the bushing 36. Then, a resilient sealing ring 74 is expanded around each of the bushing extensions 48 and 50 and is forced into the annular groove 72 defined by the collar 68 that is pressed onto that bushing extension 48 or 50. A second pair 64 of inner sidebars 26 is similarly assembled with bushings 36, collars 68, and sealing rings 74 either at the same time as the pair 62, or after assembly of the pair 62.

(b) Pins 76 are inserted into an outer sidebar portion 54 for one side 92 of the chain 16 with the heads 84 of the pins on the same side of the outer sidebar portion 54.

The method further includes the following steps after steps (a) and (b) above are performed:

One of the pins 76 described in step (b), above, is inserted into one of the bushings 36 supported by the pair 62, and the other of those pins 76 is inserted into one of the bushings 36 supported by the pair 64. Then, an outer sidebar 52 for the other side 90 of the chain 16 is placed onto the ends 78 of the pins 76 described in step (b), above, with the openings 58 of that outer sidebar 52 surrounding the ends 78 of the pins 76. Then, cotter pins 88 are respectively inserted into the cotter pin holes 86 of the pins 76 described in step (b) (or a rivet head is formed).

A further pair 94 of outer sidebars 52 is similarly connected to the pair 64 of inner sidebars 26, except that preferably the heads 84 of the pins 76 used with the pair 94 are located on the side 90 of the chain (i.e., oriented in the opposite direction to the pins 76 used with the adjacent pair 60 of outer sidebars 52).

Chain component sizes are chosen such that, after assembly, the outer sidebars 52 engage the collars 68 as well as the sealing rings 74 in the collars 68, and such that the sealing assemblies 66 engaged by the outer sidebars 52 space the outer sidebars 52 from the bushing extensions 48 or 50.

Figure 4:
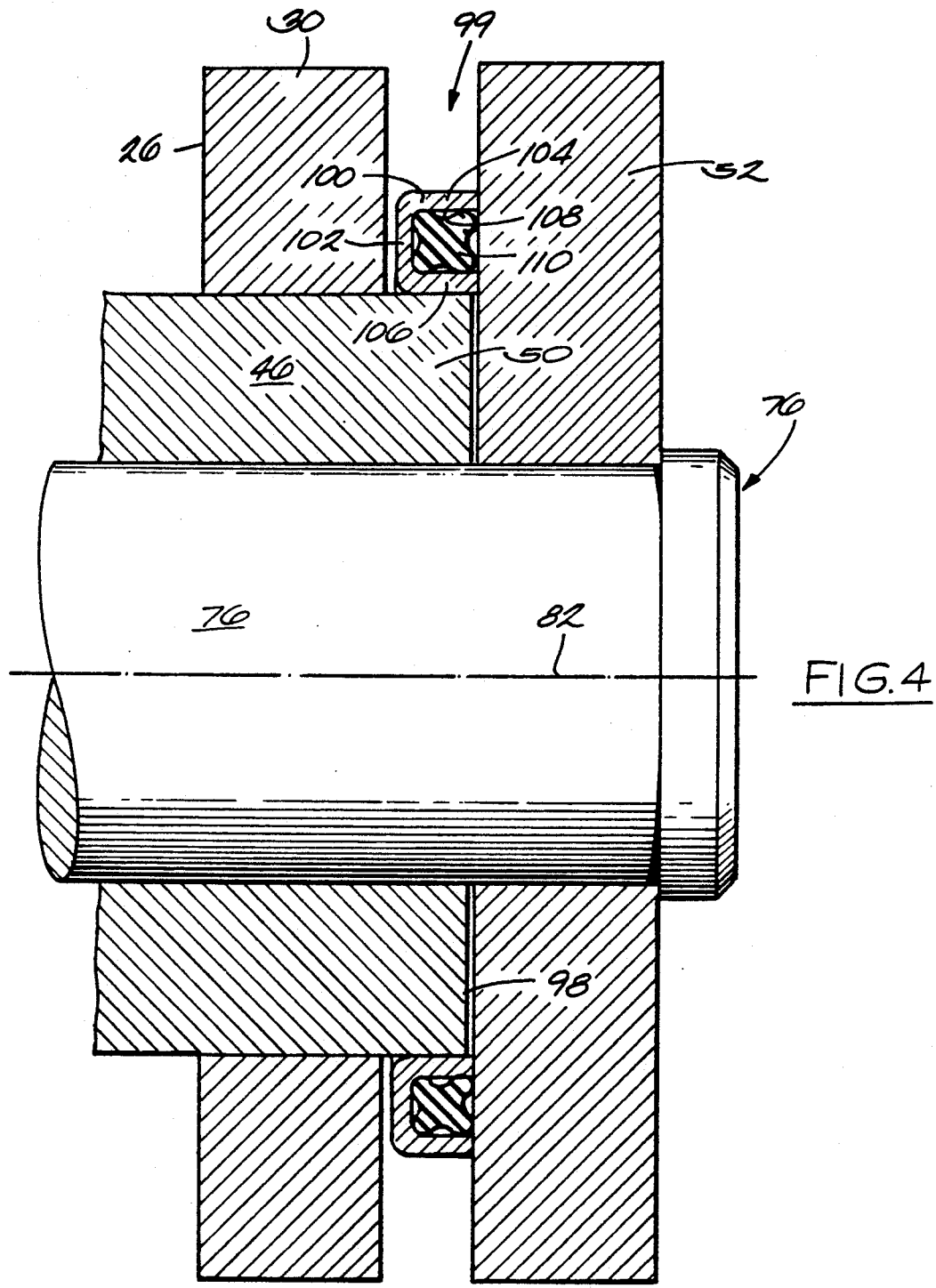
FIG. 4 is a view similar to FIG. 2 but showing an alternative embodiment of the invention.

In an alternate embodiment of the invention depicted in FIG. 4, a sealing assembly 99 surrounds the bushing extension 50 of the bushing 36 and is housed between inner sidebar 30 and outer sidebar 52. Sealing assembly 99 includes a collar 100 that is generally U-shaped in cross section pressed onto bushing extension 50 and positioned in closely spaced relation to inner sidebar 30. U-shaped collar 100 includes a bight portion 102, an outer collar portion 104 and an inner collar portion 106. Outer collar portion 104 and inner collar portion 106 are spaced apart radially and both extend toward and engage the outer sidebar 52. The bight portion 102, the outer collar portion 104 and the inner collar portion 106 define an annular groove 108 surrounding bushing extension 50. Sealing assembly 99 further includes a resilient sealing ring 110 of polymeric material housed in the annular groove 108. Resilient sealing ring 110 surrounds bushing extension 50 and engages in sealing relation with the outer sidebar 52. FIG. 4 depicts the resilient sealing ring 110 as generally X-shaped in cross section.

In an alternative arrangement, the resilient sealing ring 110 may be generally circular in cross section.

When the alternative embodiment of the invention depicted in FIG. 4 is assembled, resilient sealing ring 110 may be forced into the annular groove 108 of the generally U-shaped collar 100 before or after U-shaped collar 100 is pressed onto the bushing extension 50. Insertion of the resilient sealing ring 110 into the annular groove 108 of the U-shaped collar 100 before the U-shaped collar 100 is pressed onto the bushing extension 50 facilitates manufacturing.

While preferred embodiments of the invention have been described, various modifications are possible. It is to be understood that the disclosed chain has applications other than for use in elevators. Further, the disclosed sealing arrangement could be employed with offset sidebars, or other sidebars that are not straight sidebars. Thus, the scope of the invention is to be limited only by the scope and spirit of the following claims.

We claim:

1. A chain link assembly comprising:
  a pair of inner sidebar portions, each of said inner sidebar portions defining an aperture;
  a bushing having opposite ends, an inside surface having an inside diameter, an outside surface having an outside diameter, and said bushing including a central portion and integral bushing extensions at each end of said central portion, said bushing being supported by said pair of inner sidebar portions such that said central portion extends between said inner sidebar portions and said bushing extends through each of said apertures such that said bushing extensions project beyond and adjacent to said inner sidebar portions;
  a pair of outer sidebar portions each defining an opening having a diameter smaller than the outside diameter of said bushing extensions, one of said outer sidebar portions being adjacent to one of said bushing extensions and the other of said outer sidebar portions being adjacent to the other of said bushing extensions;
  a pin extending through said bushing, having a longitudinal axis and having opposite ends housed in said openings in said outer sidebar portions to form a chain joint;
  a pair of sealing assemblies, one of said sealing assemblies surrounding one of said bushing extensions, and the other of said sealing assemblies surrounding the other of said bushing extensions, said sealing assemblies being housed between the inner sidebar portions and the outer sidebar portions, each of said sealing assemblies including a disk shaped collar which collar has a washer shaped portion through which passes one of said bushing extensions, said washer shaped portion being positioned in adjacent but spaced relation to one of said inner sidebar portions, each washer shaped portion having a periphery and each disk shaped collar further having a circumferential flange integral with and extending longitudinally from the periphery of the washer shaped portion of that disk shaped collar toward one of said outer sidebar portions, each said disk shaped collar defining an annular groove surrounding one of said bushing extensions, and each sealing assembly further including a resilient sealing ring housed in each annular groove, each said resilient sealing ring surrounding and engaging one of said bushing extensions and also engaging in sealing relation one of said outer sidebar portions.

2. A chain link assembly in accordance with claim 1 wherein each circumferential flange engages one of said outer sidebars and maintains the outer sidebar that it engages in spaced relation from the bushing extension it surrounds, and wherein a space that is empty of visible matter is defined between the outer sidebar that it engages and the bushing extension it surrounds.

3. A chain link assembly in accordance with claim 2 wherein one of said opposite ends of said pin has a head, wherein the other of said opposite ends of said pin has a cotter pin hole transverse to the longitudinal axis of said pin, wherein said assembly further includes a cotter pin in said cotter pin hole of said pin, and wherein said outer sidebar portions, said inner sidebar portions, said bushing, and said sealing assemblies are located between said head and said cotter pin.

4. A chain link assembly in accordance with claim 2 wherein one of said opposite ends of said pin has a first head, wherein the other of said opposite ends of said pin has a rivet formed head, and wherein said outer sidebar portions, said inner sidebar portions, said bushing, and said sealing assemblies are located between said first head and said rivet formed head.

5. A chain link assembly in accordance with claim 1 wherein each of said collars are pressed onto said bushing extensions and are fixed to said bushing extensions against movement relative to said bushing extensions.

6. A chain link assembly in accordance with claim 1 wherein each of said collars comprises hardened steel.

7. A chain link assembly in accordance with claim 1 wherein each of said sealing rings comprises polymeric material.

8. A chain link assembly in accordance with claim 1 wherein each of said sealing rings is circular in cross section.

9. A chain link assembly in accordance with claim 1 wherein each of said sealing rings is X-shaped in cross section.

10. A chain link assembly as set forth in claim 1 wherein said inner sidebar portions and said outer sidebar portions are straight sidebar portions.

11. A straight sidebar chain comprising:
  a plurality of opposed, aligned pairs of inner sidebars, each of said inner sidebars comprising two inner sidebar portions, each inner sidebar portion defining an aperture,
  a plurality of tubular bushings each having opposite ends, an inside surface having an inside diameter, an outside surface having an outside diameter, a central portion, and integral bushing extensions at each end of said central portion, two of said bushing being supported by one of said pairs of inner sidebar portions such that said central portions of the two bushing respectively extend between opposed inner sidebar portions of the one pair and the two bushings extend through respective apertures of the one pair of inner sidebar portions and such that said bushing extensions of each of the two bushings project beyond and adjacent to said inner sidebar portions of the one pair,
  a plurality of opposed, aligned pairs of outer sidebars, each of said outer sidebars comprising two outer sidebar portions, each outer sidebar portion defining an opening having a diameter smaller than the outside diameter of said bushing extensions, one of said outer sidebar portions of one pair of outer sidebars being adjacent to one of said bushing extensions of one bushing and the opposed outer sidebar portion of the pair of outer sidebars being adjacent to the other of said bushing extensions of the one bushing;

a plurality of pins respectively extending through said bushings, respectively having longitudinal axes, and respectively having opposite ends housed in said openings in opposed outer sidebar portions adjacent to said bushing extensions of respective bushings to form chain joints that respectively connect pairs of inner sidebars with pairs of outer sidebars, respective radial directions being defined perpendicularly to the longitudinal axes; and a plurality of pairs of sealing assemblies, each of said pairs of sealing assemblies being associated with one of said bushings, with each of said sealing assemblies surrounding one of said bushing extensions and each of said sealing assemblies being housed between one of said inner sidebar portions and one of said outer sidebar portions, each of said sealing assemblies including a disk shaped collar which collar has a washer shaped portion through which passes one of said bushing extensions, said washer shaped portion being positioned in adjacent but spaced relation with respect t one of said inner sidebars, each said washer shaped portion having a periphery and each disk shaped collar further including a circumferential flange integral with and extending longitudinally from the periphery of the washer shaped portion of that disk shaped collar toward and engaging one of said outer sidebars, each said disk shaped collar defining an annular groove surrounding one of said bushing extensions; and said sealing assemblies further including resilient sealing rings respectively housed in said annular grooves, each said resilient sealing ring surrounding and engaging one of said bushing extensions and also engaging in sealing relation the outer sidebar engaged by the collar in which it is housed.

12. A straight sidebar chain in accordance with claim 11 wherein each said circumferential flange maintains the outer sidebar that it engages in spaced relation from the bushing extension it surrounds, and wherein a space that is empty of visible matter is defined between the outer sidebar that it engages and the bushing extension it surrounds.

13. A straight sidebar chain in accordance with claim 11 wherein one of said opposite ends of each pin has a head, wherein the other if said opposite ends of each pin has a cotter pin hole transverse to the longitudinal axis of the one pin, wherein said chain further includes a cotter pin in each said cotter pin hole, wherein said outer sidebar portions, said inner sidebar portions, said bushing, and said sealing assemblies are located axially between said heads and said cotter pins.

14. A straight sidebar chain in accordance with claim 11 wherein each of said collars comprises metal.

15. A straight sidebar chain in accordance with claim 11 wherein each of said collars comprises hardened steel.

16. A straight sidebar chain in accordance with claim 11 wherein each of said sealing rings comprises polymeric material.

17. A straight sidebar chain in accordance with claim 11 wherein each of said sealing rings is circular in cross section.

18. A straight sidebar chain in accordance with claim 11 wherein each of said sealing rings is X-shaped in cross section.

19. A straight sidebar chain in accordance with claim 11 wherein for one pair of outer sidebars the head of each of said pins engages one of the sidebars of that pair of outer sidebars.

20. A straight sidebar chain in accordance with claim 19 wherein said chain has first and second sides, and wherein the heads of pins housed in one pair of opposed outer sidebars are on the first side of said chain, and wherein the heads of pins housed in an adjacent pair of opposed outer sidebars are on the second side of said chain.

21. A method of manufacturing a straight sidebar chain, said method comprising:

providing a pair of inner sidebar portions, each of the inner sidebar portions defining an aperture; providing a tubular shaped bushing having opposite ends, inside and outside diameters, and an inside surface, and including a central portion and integral bushing extensions at each end of the central portion; causing the bushing to be supported by the pair of inner sidebar portions such that the central portion extends between the inner sidebar portions and through each of the apertures and such that the bushing extensions project beyond the inner sidebar portions; respectively pressing a first and second disk shaped collar onto each of the bushing extensions and in closely spaced relation to the inner sidebar portions, each disk shaped collar having a washer shaped portion through which one of the bushing extensions passes, each disk shaped collar further having a circumferential flange integral with and extending from the washer shaped portion of the collar away from the other collar, each disk shaped collar defining an annular groove surrounding one of the bushing extensions; respectively expanding a first and second resilient sealing ring around each of the bushing extensions and respectively forcing the sealing rings into the annular grooves, the resilient sealing rings respectively surrounding and engaging the bushing extensions;

providing an outer sidebar portion defining an opening having a diameter smaller than the outside diameter of the bushing extension; and aligning the opening of the outer sidebar portion with the inner diameter of the bushing with the outer sidebar portion adjacent to one of the bushing extensions and with the outer sidebar portion engaging one of the collars as well as the sealing ring in the one collar, the sealing ring and the collar engaged by the outer sidebar portion spacing the outer sidebar portion from the bushing extension.

22. A chain link assembly comprising:

a pair of inner sidebar portions, each of said inner sidebar portions defining an aperture;

a bushing having opposite ends, an inside surface having an inside diameter, an outside surface having an outside diameter, and said bushing including a central portion and integral bushing extensions at each end of said central portion, said bushing being supported by said pair of inner sidebar portions such that said central portion extends between said inner sidebar portions and said bushing extends through each of said apertures such that said bushing extensions project beyond and adjacent to said inner sidebar portions;

a pair of outer sidebar portions each defining an opening having a diameter smaller than the outside diameter of said bushing extensions, one of said outer sidebar portions being adjacent to one of said bushing extensions and the other of said outer sidebar portions being adjacent to the other of said bushing extensions;

a pin extending through said bushing, having a longitudinal axis and having opposite ends housed in said openings in said outer sidebar portions to form a chain joint; and a pair of sealing assemblies, one of said sealing assemblies surrounding one of said bushing extensions, and the other of said sealing assemblies being housed between the inner sidebar portions and the outer sidebar portions, each of said sealing assemblies including a collar which collar has a washer shaped portion through which passes one of said bushing extensions, each collar having an outer collar portion and an inner collar portion defining an annular groove therebetween, said inner collar portion and said outer collar portion of each collar being integral with the washer shaped portion of that collar, said annular groove opening toward one of said outer sidebars, and a resilient sealing ring housed in said annular groove, said resilient sealing ring surrounding said bushing extension and engaging in sealing relation one of said outer sidebars.

23. A chain link assembly in accordance with claim 22 wherein said collar includes a bight portion joining the outer collar portion and the inner collar portion.

24. A chain link assembly in accordance with claim 22 wherein said collar is adjacent but spaced outwardly from the inner sidebar.

25. A chain link assembly in accordance with claim 22 wherein the outer collar portion engages one of said outer sidebars and maintains the outer sidebar that it engages in spaced relation from the bushing extension it surrounds.

26. A chain link assembly in accordance with claim 22 wherein each of said collars are pressed onto said bushing extensions and are fixed to said bushing extensions.

27. A chain link assembly in accordance with claim 22 wherein each of said collars comprises hardened steel.

28. A chain link assembly in accordance with claim 22 wherein each of said sealing rings comprises polymeric material.

29. A chain link assembly in accordance with claim 22 wherein each of said sealing rings is circular in cross section.

30. A chain link assembly in accordance with claim 22 wherein each of said sealing rings is X-shaped in cross section.

31. A chain link assembly as set forth in claim 22 wherein said inner sidebar portions and said outer sidebar portions are straight sidebar portions.

32. A chain link assembly comprising:

a pair of inner sidebars, each having an aperture;

a hollow cylindrical bushing having opposite ends, and having an outside diameter, the opposite ends of said bushing being housed in said apertures in said pair of inner sidebars such that the opposite ends of said bushing extend through said apertures and project beyond and adjacent to said inner sidebars;

a pair of outer sidebars each having an aperture having a diameter smaller than the outside diameter of said bushing, one of said outer sidebars being adjacent to one of said opposite ends of said bushing and the other of said outer sidebars being adjacent to the other of said opposite ends of said bushing;

a pin extending through said bushing, having a longitudinal axis, and having opposite ends housed in said apertures in said outer sidebars to form a chain joint; and a pair of sealing assemblies, each of said pairs of sealing assemblies being associated with one of said bushings, with each of said sealing assemblies surrounding one of said opposite ends of one of said bushings, said sealing assemblies being housed between the inner sidebars and the outer sidebars, each of said sealing assemblies including a resilient sealing ring surrounding one of said opposite ends of said bushing and engaging in sealing relation said outer sidebar and a collar having a washer shaped portion through which passes one of said opposite ends of said bushing, having an outer portion integral with said washer shaped portion and surrounding said resilient sealing ring, and having a second portion radially between the resilient sealing ring and the adjacent inner sidebar.

33. A chain link assembly in accordance with claim 32 wherein said collar is positioned in adjacent but spaced relation from the inner sidebar.

34. A chain link assembly in accordance with claim 32 wherein said outer portion engages one of said outer sidebars and maintains the outer sidebar that it engages in spaced relation from the bushing it surrounds.

35. A chain link assembly in accordance with claim 32 wherein each of said collars are metallic and are pressed onto said bushing.

36. A chain link assembly in accordance with claim 32 wherein each of said collars is formed of hardened steel.

37. A chain link assembly in accordance with claim 32 wherein each of said resilient sealing rings is formed of polymeric material.

38. A chain link assembly in accordance with claim 32 wherein each of said resilient sealing rings is circular in cross section.

39. A chain link assembly in accordance with claim 32 wherein each of said sealing rings is X-shaped in cross section.

* * * * *

UNITED STATES PATENT AND TRADEMARK OFFICE
CERTIFICATE OF CORRECTION

PATENT NO. : 5,269,729

DATED : December 14, 1993

INVENTOR(S) : John H. Thuerman, George C. Seaman, Robert M. Miller

It is certified that error appears in the above-indentified patent and that said Letters Patent is hereby corrected as shown below:

In Column 9, line 16, after "assemblies", insert --surrounding the other of said bushing extension, said sealing assemblies--.

Signed and Sealed this

Twenty-first Day of June, 1994

Attest:

BRUCE LEHMAN

Attesting Officer     Commissioner of Patents and Trademarks